(12) United States Patent
Khan

(10) Patent No.: US 6,183,717 B1
(45) Date of Patent: Feb. 6, 2001

(54) TRANSITION METAL OXIDE-CONTAINING MATERIALS AND THE SYNTHESIS THEREOF

(75) Inventor: M. Ishaque Khan, Skokie, IL (US)

(73) Assignee: Illinois Institute of Technology, Chicago, IL (US)

( * ) Notice: Under 35 U.S.C. 154(b), the term of this patent shall be extended for 0 days.

(21) Appl. No.: 09/243,901

(22) Filed: Feb. 3, 1999

(51) Int. Cl.[7] .............................. C01G 45/12; B01J 23/32; B01J 23/00; B01J 23/40; B01J 23/16
(52) U.S. Cl. .................. 423/593; 423/599; 502/324; 502/325; 502/326; 502/338; 502/340; 502/344; 502/353
(58) Field of Search ..................... 423/593, 599; 502/324, 325, 326, 338, 340, 344, 353

(56) References Cited

U.S. PATENT DOCUMENTS

| | | |
|---|---|---|
| 2,888,323 | 5/1959 | Teichner . |
| 2,992,892 | 7/1961 | Goren . |
| 3,513,109 | 5/1970 | Stiles . |
| 3,956,187 | 5/1976 | Betz . |
| 4,454,244 | 6/1984 | Woltermann . |
| 4,619,822 | 10/1986 | Hammou et al. . |
| 4,816,243 | 3/1989 | Guttmann et al. . |
| 5,380,692 | 1/1995 | Nakatsuji et al. . |
| 5,578,282 | 11/1996 | O'Young et al. . |
| 5,637,545 | 6/1997 | Lewis . |
| 5,702,674 | 12/1997 | O'Young et al. . |

Primary Examiner—Tom Dunn
Assistant Examiner—Cam N. Nguyen
(74) Attorney, Agent, or Firm—Pauley Petersen Kinne & Fejer

(57) ABSTRACT

Mixed-metal oxide-based solids composed of a linked array of a plurality of vanadium oxide building blocks wherein a vanadium and oxygen shell cluster encapsulate a central X unit, where X is at least one species selected from the group consisting of $VO_4$, $SO_4$, Cl, Br, I, $H_2O$, HCOO and $NO_2$ and associated methods of synthesis are provided.

8 Claims, 2 Drawing Sheets

TRANSITION METAL OXIDE-CONTAINING MATERIALS AND THE SYNTHESIS THEREOF

BACKGROUND OF THE INVENTION

This invention relates generally to transition metal oxide-containing materials and, more particularly, to vanadium oxide-containing compositions and the rational synthesis thereof.

Transition metal oxide surfaces are known to serve as catalytic surfaces for a large number of important industrial chemical transformations. The mechanism of their interaction with substrate molecules, however, is generally not well understood due mainly to the complex nature of these poorly characterized surfaces that are generally inaccessible to various physical chemical analytical techniques. As a result, the suitability of particular catalytic surfaces for specific processes is currently commonly determined empirically with practically little or no possibility of systematic improvements in the performance of such catalytic materials.

As will be appreciated, numerous environmental and technological challenges exist for the application of such catalytic materials. Such challenges range from and include the removal of toxic materials from automotive vehicle exhaust and industrial flue streams, selective or controlled oxidation of hydrocarbons, photochemical conversion of water into $H_2$ and $O_2$, synthesis of gasoline from synthesis gas (also referred to as "syn-gas"), cost-effective nitrogen fixation, preparation of food stuffs and drugs, and removal of urea from blood, for example.

Polyoxometalates or transition metal oxide clusters (such as of vanadium, molybdenum and tungsten, for example) and their derivatives provide remarkably diverse and well-defined building blocks generally believed well suited for use in generating or assembling nanosized molecular systems. Recently, conventional organic and inorganic ligands (e.g., $PO_4^{3-}$, $AsO_4^{3-}$, $SO_4^{2-}$, etc.) have been used to join together or "glue" metal oxide moieties to prepare supramolecular structures and solids. Such ligands, however, generally have only limited thermal stability and may be scarce.

In view of the above, there is a need and a demand for a rational synthesis of well characterizable metal oxide surfaces with desired features—with and without immobilized catalytic active groups (such as metal ions, cluster compounds, organometallic fragments, asymmetric ligands, enzymes or cells, for example) such as may be helpful or useful in the satisfaction of one or more environmental or technological requirements such as described above.

SUMMARY OF THE INVENTION

A general object of the invention is to provide for the rational synthesis of transition metal oxide-containing materials and the materials resulting therefrom.

A more specific objective of the invention is to overcome one or more of the problems described above.

The general object of the invention can be attained, at least in part, through a composition represented by the chemical formula:

$(Cat)_m[M_aV_{18}O_{42}XL_{3z}]^{n-} \cdot bE$, where:
a) Cat is at least one cationic species;
b) M is at least one species of metallic element;
c) X is at least one species selected from the group consisting of $VO_4$, $SO_4$, Cl, Br, I, $H_2O$, HCOO and $NO_2$;
d) E is at least one species selected from the group consisting of $H_2O$, $N_2H_4$ and organic solvents;
e) L is at least one species selected from the group consisting of $H_2O$, O, NO, $N_2$, acetyl acetone, pyridine, 2,2'-bipyridine, $(H_2N(CH_2)_dNH_2)$ (d=2 or 3), $RNH_2$ and $R_2NH$;
where if L=monodentate, then z=4 and where if L=bidentate, then z=2 or 4; and
a=2 or 3;
m=the number of cations and is in the range of about 0 to about 12;
n=the units of negative charge and is in the range of about 2 to about 6, except where m=0 in which case n=0 and
b=the number of solvent/neutral molecule(s)—E, in the lattice and is in the range of about 12 to about 30.

The prior art generally fails to provide an as simple as desired approach for the selectable synthesis of materials such as composed of well-defined metal oxide clusters.

The invention further comprehends a mixed-metal oxide-based solid which includes a linked array of a plurality of vanadium oxide building blocks wherein a vanadium and oxygen shell cluster encapsulates a central X unit, where X is at least one species selected from the group consisting of $VO_4$, $SO_4$, Cl, Br, I, $H_2O$, HCOO and $NO_2$.

The invention still further comprehends a method of making a mixed-metal oxide-based solid. In accordance with one embodiment, such a method includes the step of forming a linked array of metal and oxygen shell clusters each encapsulating a central X unit where X is at least one species selected from the group consisting of $VO_4$, $SO_4$, Cl, Br, I, $H_2O$, HCOO and $NO_2$.

Other objects and advantages will be apparent to those skilled in the art from the following detailed description taken in conjunction with the appended claims and drawings.

DETAILED DESCRIPTION OF THE INVENTION

Figure 1:
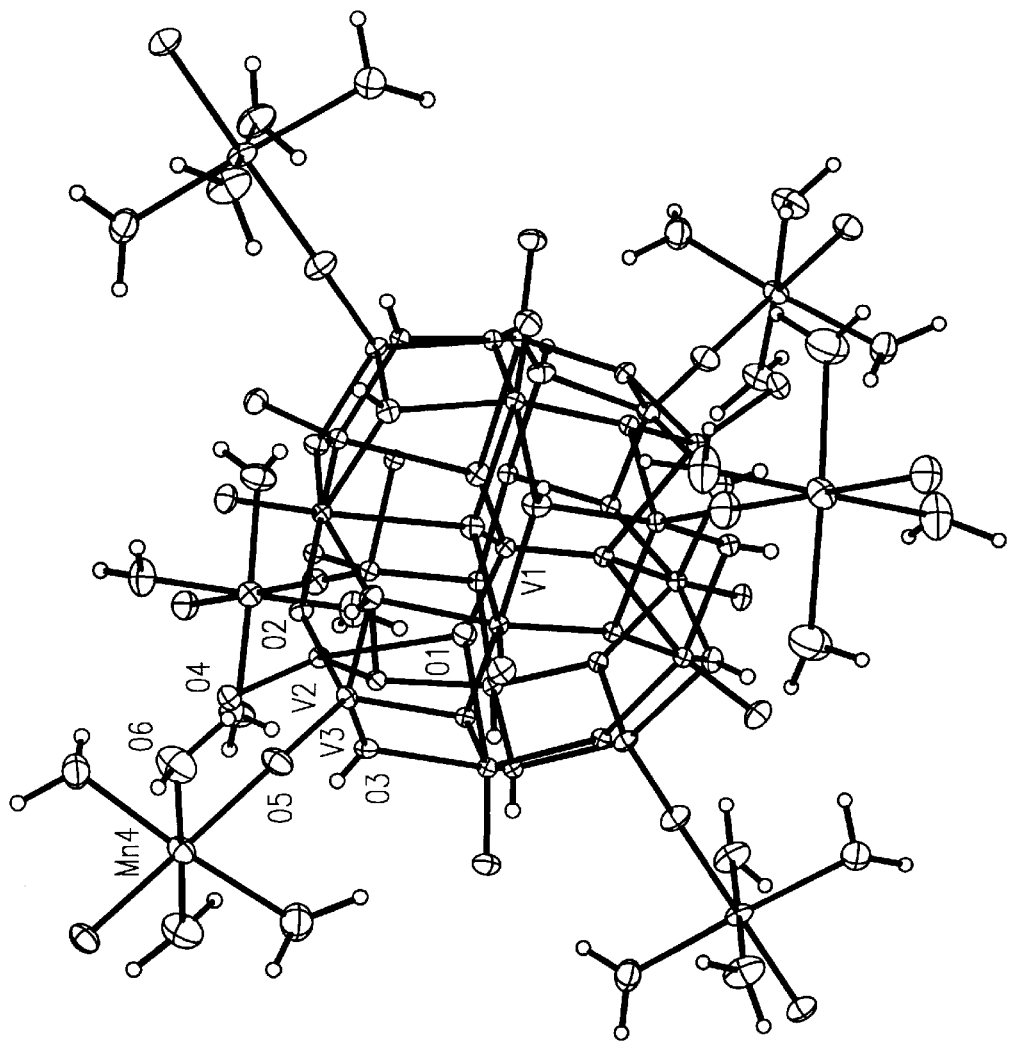
FIG. 1 is a simplified schematic perspective view of a building unit in the crystal structure of $[H_6Mn_3V_{18}O_{42}(VO_4)(H_2O)_{12}] \cdot 30H_2O$ in accordance with one embodiment of the invention.

The present invention provides a relatively simple approach for the selectable synthesis of materials composed of well-defined metal oxide clusters.

In accordance with one embodiment of the invention, a generalized procedure for the synthesis of stable and novel metal oxide-based solid surfaces and framework materials is provided wherein well-defined metal oxide moieties are present as building blocks and which building blocks such as are bridged or joined together without employing conventional ligands.

In accordance with the invention, vanadium oxide and mixed metal oxide-based materials represented by the chemical formula (1), below have been synthesized and characterized:

$$(Cat)_m[M_aV_{18}O_{42}XL_{3z}]^{n-}\cdot bE, \qquad (1)$$

where:
a) Cat is at least one cationic species;
b) M is at least one species of metallic element;
c) X is at least one species selected from the group consisting of $VO_4$, $SO_4$, Cl, Br, I, $H_2O$, HCOO and $NO_2$;
d) E is at least one species selected from the group consisting of $H_2O$, $N_2H_4$ and organic solvents;
e) L is at least one species selected from the group consisting of $H_2O$, O, NO, $N_2$, acetyl acetone, pyridine, 2,2'-bipyridine, $(H_2N(CH_2)_dNH_2)$ (d=2 or 3), $RNH_2$ and $R_2NH$;
where if L=monodentate, then z=4 and where if L=bidentate, then z=2 or 4; and
a=2 or 3;
m=the number of cations and is in the range of about 0 to about 12;
n=the units of negative charge and is in the range of about 2 to about 6, except where m=0 in which case n=0 and
b=the number of solvent/neutral molecule(s)—E, in the lattice and is in the range of about 12 to about 30.

In accordance with certain preferred embodiments of the invention, particularly preferred cations (Cat) for incorporation or use in the mixed metal oxide-based materials represented by the chemical formula (1) can be a monovalent or divalent cationic species. For example, particular monovalent cationic species for use in the practice of the invention can desirably be selected from the group consisting of: $H^+$, $Li^+$, $Na^+$, $K^+$, $Rb^+$, $Cs^+$, $NH_4^+$, $N_2H_5^+$, $H_3O^+$, $R_4N^+$ and quaternary amines. Particular divalent cationic species for use in the practice of the invention include divalent cationic species of a Group IIA element such as calcium or barium, for example.

Particular metallic species, M, for use in the practice of the invention include at least one element selected from the group consisting of Mn, Fe, Co, Ni, Cu, Zn, Ga, Cr, Mo, W, Ti, V, Nb, Ta, Y, Zr, Re, Ru, Os, Pd, Pt, Mg, Ca, Sn, Cd, La, Lanthanides and Actinides.

Specifically prepared prototype compositions represented by the chemical formula (1) above include:
1. $[H_6Mn_3V_{18}O_{42}(VO_4)(H_2O)_{12}]\cdot 30H_2O$
2. $[M'_3V_{18}O_{42}(AO_4)(H_2O)_{12}]\cdot 24H_2O$, where M' is at least one element selected from the group consisting of Mn, Fe and Co and A is at least one element selected from the group consisting of S and V, e.g.,:
   a. $[Mn_3V_{18}O_{42}(AO_4)(H_2O)_{12}]\cdot 24H_2O$ (A=S, V)
   b. $[Fe_3V_{18}O_{42}(AO_4)(H_2O)_{12}]\cdot 24H_2O$ (A=S, V)
   c. $[Co_3V_{18}O_{42}(AO_4)(H_2O)_{12}]\cdot 24H_2O$ (A=S, V)
3. The material of chemical formula (1) wherein Cat is $N_2H_5^+$, m=2, M=Zn or Mg, a=3, X=$SO_4$, L=$H_2O$, z=4, b=24 and E=$H_2O$, e.g.,:
   a. $(N_2H_5)_2[Zn_3V_{18}O_{42}(SO_4)(H_2O)_{12}]\cdot 24H_2O$
   b. $(N_2H_5)_2[Mg_3V_{18}O_{42}(SO_4)(H_2O)_{12}]\cdot 24H_2O$
4. The material of chemical formula (1) wherein Cat is $Li^+$, m=6, M=Cd or Ni, a=2, X=$SO_4$ or $VO_4$, L=$H_2O$, z=4, b=24 and E=$H_2O$, e.g.,:
   a. $Li_6[Cd_3V_{18}O_{42}(AO_4)(H_2O)_{12}]\cdot 24H_2O$ (A=S, V)
   b. $Li_6[Ni_3V_{18}O_{42}(SO_4)(H_2O)_{12}]\cdot 24H_2O$ General Synthesis Method In accordance with the invention, a method for the general synthesis of mixed-metal oxide-based compositions of the invention involves first the addition of water or an aqueous solution (such as a 3 mL solution of a 5 mmol aqueous solution) of CatOH (Cat=$Li^+$, $Na^+$, $K^+$, $Rb^+$, $Cs^+$, $NH_4^+$, $N_2H_5^+$, $H_3O^+$, $R_4N^+$ and quaternary amines) to a stirring slurry of $V_2O_5$ in hot water, e.g., 2.5 mmol of $V_2O_5$ in 10 mL of 40–93° C. water. After treating the resulting solution with a reducing agent (e.g., hydrazinium sulfate, hydrazinium chloride, or hydrazinium hydroxide), the reaction mixture is then further heated, e.g., heated for an additional 10 minutes, to obtain a dark solution. The dark solution is then diluted with an additional quantity of water (e.g., to 25 ml) and subsequently treated with an appropriate salt of at least one species of metallic element M (such as described above) with L (e.g., 1.25 mmol, where L=$H_2O$, O, NO, $N_2$, acetyl acetone, pyridine, 2,2'-bipyridine, $(H_2N(CH_2)_dNH_2)$ (d=2 or 3), $RNH_2$ and $R_2NH$, for example) and further heated (e.g., for 1 to 12 hours). The resultant solution can then be stored at room temperature and the precipitated product filtered from the mother liquor, washed if necessary to remove any impurity, and dried, such as in air at room temperature.

Thus, in accordance with one synthesis method in accordance with the invention, a linked array of $V_{18}O_{42}X$ metal and oxygen clusters is formed by adding an aqueous solution of CatOH to a heated aqueous slurry of $V_2O_5$ to form a first resulting solution, where Cat is at least one cationic species selected from the group consisting of $Li^+$, $Na^+$, $K^+$, $Rb^+$, $Cs^+$, $NH_4^+$, $N_2H_5^+$, $H_3O^+$, $R_4N^+$ and quaternary amines. The first resulting solution is subsequently treated with a reducing agent to form a reaction mixture which, in turn, is treated a salt of the particularly desired metallic element.

The synthesis method of the invention is now further described with reference to the synthesis of the above-identified prototype composition, $[H_6Mn_3V_{18}O_{42}(VO_4)(H_2O)_{12}]\cdot 30H_2O$ which was prepared in the following manner:

An aqueous solution (3 mL) of $LiOH\cdot H_2O$ (5 mmol) was added to a slurry of $V_2O_5$ (2.5 mmol) in water (10 mL) maintained at 95° C. After treating the resulting solution with solid hydrazinium sulfate (2.5 mmol), the reaction mixture was heated for another 5–10 minutes. The dark solution was diluted to 25 ml and subsequently treated with $KMnO_4$ (1.25 mmol) and heated for 1.5 hours. The resultant solution was filtered and allowed to stay at room temperature for 12 hours. Dark black prism shaped crystals were filtered from the mother liquor, washed with water, and dried in air at room temperature to give 0.25 g (60% yield based on vanadium) of $[H_6Mn_3V_{18}O_{42}(VO_4)(H_2O)_{12}]\cdot 30H_2O$.

As will be appreciated, such a synthesis method generally provides a simple procedure for linking or otherwise assembling building blocks, such as composed of polyoxometalates and/or metal oxide fragments, to form framework materials or solids without incorporating conventional ligands, that may be scarce and generally have limited stability. Given that well-characterized metal oxide clusters and compounds can be employed in the practice of the invention, rationally designed transition metal oxide-based solid surfaces and materials with desired properties, such as relating to catalysis, redox, sorbtion, ion exchange, etc., can be synthesized in accordance with the invention.

The x-ray structural analysis of a single crystal of the above preparation of $[H_6Mn_3V_{18}O_{42}(VO_4)(H_2O)_{12}]\cdot 30H_2O$ revealed a highly symmetrical three-dimensional framework structure (see FIG. 2) composed of the transition metal oxide building-block units, shown in FIG. 1. The extended structure consists of "spheres" of $\{V_{19}O_{46}\}$ cores each linked, in three dimensional array, by six $\mu_2$-$\{Mn(H_2O)_4\}$ bridges to six other neighboring $\{V_{19}O_{46}\}$ units. This generates a network of $[-\{V_{19}O_{46}\}-\mu_2\text{-}Mn(H_2O)_4\text{-}\{V_{19}O_{46}\}-]_\infty$ arrays running along three mutually perpendicular directions. Alternatively, the structure of $[H_6Mn_3V_{18}O_{42}(VO_4)(H_2O)_{12}]\cdot 30H_2O$ can be described as infinite arrays of $\{V_{19}O_{46}\}$ clusters each cluster connected with six other $\{V_{19}O_{46}\}$ clusters through six $\mu_2\{Mn(H_2O)_4\}$ bridges.

Each $\{V_{19}O_{46}\}$ unit, such as shown in FIG. 1, can be viewed as constructed from a $\{V_{18}O_{42}\}$ shell or cluster encapsulating a tetrahedral $\{VO_4\}^{3-}$ group which interacts with the 12 V-centers of the shell, each oxygen (O1) of the $\{VO_4\}^{3-}$ unit (V1-O=1.661 Å) interacting in $\mu_4$-mode with three V(2)- centers, forming V(1)-O(1)-V(2)$_{shell}$ bonds (O1-V$_{shell}$=2.440 Å) and forcing a local idealized tetrahedral symmetry upon the $\{V_{19}O_{46}\}$ unit. The 12 $\{VO_6\}$ units of the $\{V_{19}O_{46}\}$ core are fuse with 6 $\{VO_5\}$ groups through common edges and linked with the central $\{VO_4\}$ unit via corner sharing. The octahedral geometry around each vanadium (V2) in the 12$\{VO_6\}$ units is defined by a terminal oxo-group (O4) (V2-O4=1.609 Å), four $\mu_3$-oxygens (O2, O3) of the shell (V2-O=1.949–1.981 Å) and one $\mu_4$-oxygen (O1) (O1-V2 =2.440 Å) from the central $\{VO_4\}$ unit. The geometry around each one of the square-pyramidal vanadium (V3) in the six $\{VO_5\}$, is defined by four basal $\mu_3$-oxo groups (O2, O3) (V3-O=1.889–2.019 Å) from the shell and an apical $\mu_2$-oxygen (O5) (V3-O5=1.640 Å) which in turn is linearly bonded to the manganese(II) center of one of the six $\{Mn(H_2O)_4\}$ bridges, forming $\{V(3)\text{-}O(5)\text{-}Mn(H_2O)_4\text{-}O(5)\text{-}\}$ bonds, that link the $\{V_{19}O_{46}\}$ clusters with each other. The octahedral geometry around each manganese(II) is completed by four oxygen atoms (O6) from the aqua ligands (Mn-O(H$_2$) =2.220 Å), each one disordered over three positions, and two trans- $\mu_2$-oxo groups (O5) (Mn-O=2.136 Å).

Bond valence sum (BVS) calculations and metal-oxygen bond lengths identify twelve O3 groups having attached hydrogen, which refines with occupancy of 0.5, and O6 to be H$_2$O. This conclusion and the result of manganometric titration of V$^{IV}$ sites (15 V$^{IV}$ per formula unit) are consistent with the charge balance consideration and mixed-valence nature of $[H_6Mn_3V_{18}O_{42}(VO_4)(H_2O)_{12}]\cdot 30H_2O$.

Figure 2:
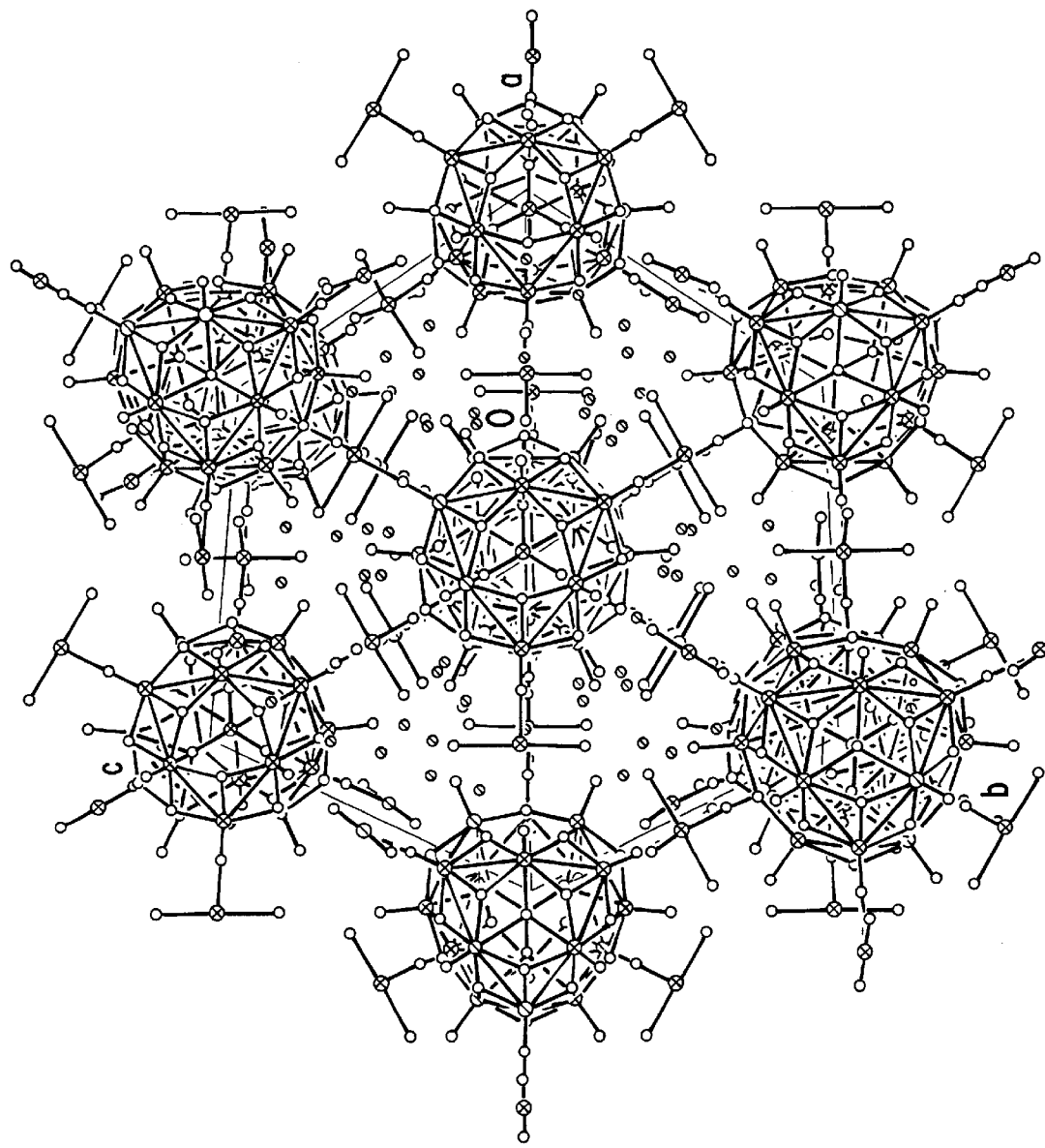
FIG. 2 is a simplified schematic perspective view of the extended structure of $[H_6Mn_3V_{18}O_{42}(VO_4)(H_2O)_{12}] \cdot 30H_2O$ in accordance with one embodiment of the invention.

As shown in FIG. 2, the packing of $[H_6Mn_3V_{18}O_{42}(VO_4)(H_2O)_{12}]\cdot 30H_2O$ generates tunnels and cavities, defined by $\{V_{19}O_{46}\}$ and $\{Mn(H_2O)_4\}$ units, occupied by lattice water molecules. Thermogravimetric analysis of $[H_6Mn_3V_{18}O_{42}(VO_4)(H_2O)_{12}]\cdot 30H_2O$ showed an initial weight loss of about 20.5%, corresponding to the total removal of the lattice water, at 70° C. followed by weight loss due to the removal of coordinated water at 257° C. Further heating up to 500° C. resulted in the formation of a stable reduced mixed-metal oxide phase without further weight loss. A sample of $[H_6Mn_3V_{18}O_{42}(VO_4)(H_2O)_{12}]\cdot 30H_2O$ heated at 70° C. for four hours exhibited reversible water absorption as evidenced by infrared spectral studies.

The chemistry associated with $\{V_{19}O_{46}\}$ and $\{V_{18}O_{42}\}$ cores is further exploitable for synthesizing new surfaces, for example, functional derivatives of materials of (1), such as for $[H_6Mn_3V_{18}O_{42}(VO_4)(H_2O)_{12}]\cdot 30H_2O$ the replacement of H$_2$O from $\{Mn(H_2O)_4\}$ by other organic and inorganic groups may offer possibility of anchoring groups (e.g., metal ions, clusters, asymmetric units) deemed suitable for enhancing the reactivity of the surface. Also, the bridging Mn(II) centers may be substituted by other metal ions and organometallic groups.

Correspondingly, mixed-metal oxide-based solids in accordance with the invention can generally be described as composed of a linked array of a plurality of vanadium oxide building blocks wherein a vanadium and oxygen shell cluster encapsulates a central X unit, where X is at least one species such as VO$_4$, SO$_4$, Cl, Br, I, H$_2$O, HCOO and NO$_2$, for example.

In accordance with one particular embodiment of the invention, such vanadium oxide building blocks are desirably linked to several other of the vanadium oxide building blocks by bridges such as may include an L species selected from the group consisting of H$_2$O, O, NO, N$_2$, acetyl acetone, pyridine, 2,2'-bipyridine, (H$_2$N(CH$_2$)$_d$NH$_2$) (d=2 or 3), RNH$_2$ and R$_2$NH. Further, in particular mixed-metal oxide-based solids in accordance with the invention, at least one of such linking bridges comprises ML$_z$, where M is a metallic element species and where if, L=monodentate then z=4 and where if, L=bidentate then z=2 or 4.

In the above-described embodiment, vanadium oxide building blocks are linked to six other such vanadium oxide building blocks in a three-dimensional array. More specifically, the vanadium oxide building block can be described as a V$_{18}$O$_{42}$ vanadium and oxygen shell cluster which encapsulates a central VO$_4$ unit with such a V$_{18}$O$_{42}$ (VO$_4$) vanadium and oxygen shell cluster linked in three dimensional array by six $\mu_2$-$\{Mn(H_2O)_4\}$ bridges to six neighboring V$_{18}$O$_{42}$(VO$_4$) vanadium and oxygen shell clusters.

In accordance with one preferred embodiment of the invention, the method of forming the linked array of V$_{18}$O$_{42}$X metal and oxygen shell clusters includes the step of adding an aqueous solution of CatOH to a heated aqueous slurry of V$_2$O$_5$ to form a first resulting solution, where Cat is at least one cationic species selected from the group consisting of Li$^+$, Na$^+$, K$^+$, Rb$^+$, Cs$^+$, NH$_4^+$, N$_2$H$_5^+$, H$_3$O$^+$, R$_4$N$^+$ and quaternary amines. The first resulting solution is subsequently treated with a reducing agent to form a reaction mixture. The reaction mixture is subsequently with a salt of a metallic element.

As will be appreciated, the compositions of the invention can desirably find use in various applications including, for example, as catalysts in various processes such as the cracking, isomerization, polymerization and selective oxidation of hydrocarbons, in the production of synthetic gasoline, as shape-selective catalysts, and in the catalytic reduction of NO$_x$ and/or SO$_x$ gases from various process streams such as the flue gas streams of power plants, chemical and petrochemical industries and the exhaust of automobiles, for example. For example, there is a need for inexpensive materials to replace precious metal catalysts (e.g., platinum, rhodium, and palladium, for example) such as currently commonly employed in automobiles, power plants and nuclear facilities for the cleanup of exhaust gases, such as the removal of one or more of NO$_x$, CO, NH$_3$, SO$_2$ and volatile organic chemicals (VOC's) therefrom.

Other desirable uses or applications may include in inorganic membranes such as may be used in the separation of gases; various solid state devices such as chemical sensors and magnetic devices; as ionic or electrical conductors such as cathode materials in battery and fuel cell applications; various medicinal applications such as relating to antitumoural, antiviral and antibacterial properties or characteristics, ion exchange, dehydration and solid acid applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A composition represented by the chemical formula:

$$(Cat)_m[M_aV_{18}O_{42}XL_{3z}]^{n-} \cdot bE,$$

where:
a) Cat is at least one cationic species;
b) M is at least one species of metallic element;
c) X is at least one species selected from the group consisting of $VO_4$, $SO_4$, Cl, Br, I, $H_2O$, HCOO and $NO_2$;
d) E is at least one species selected from the group consisting of $H_2O$, $N_2H_4$ and organic solvents;
e) L is at least one species selected from the group consisting of $H_2O$, O, NO, $N_2$, acetyl acetone, pyridine, 2,2'-bipyridine, $(H_2N(CH_2)_dNH_2)$ (d=2 or 3), $RNH_2$ and $R_2NH$;
where if L=monodentate, then z=4 and
where if L=bidentate, then z=2 or 4; and
a=2 or 3;
m=the number of cations and is in the range of about 0 to about 12;
n=the units of negative charge and is in the range of about 2 to about 6, except where m=0 in which case n=0 and
b=the number of solvent/neutral molecule(s)—E, in the lattice and is in the range of about 12 to about 30.

2. The composition of claim 1 wherein Cat is at least one monovalent cationic species selected from the group consisting of $H^+$, $Li^+$, $Na^+$, $K^+$, $Rb^+$, $Cs^+$, $NH_4^+$, $N_2H_5^+$, $H_3O^+$, $R_4N^+$ and quaternary amines.

3. The composition of claim 1 wherein Cat is at least one divalent cationic species.

4. The composition of claim 3 wherein the at least one divalent cationic species is of a Group IIA element selected from the group consisting of calcium and barium.

5. The composition of claim 1 represented by the chemical formula:

$$[H_6Mn_3V_{18}O_{42}(VO_4)(H_2O)_{12}] \cdot 30H_2O.$$

6. The composition of claim 1 represented by the chemical formula:

$$[M'_3V_{18}O_{42}(AO_4)(H_2O)_{12}] \cdot 24H_2O,$$

where
M' is at least one element selected from the group consisting of Mn, Fe and Co; and
A is at least one element selected from the group consisting of S and V.

7. The composition of claim 1 wherein:
Cat is $N_2H_5^+$, m=2, M=Zn or Mg, a=3, X=$SO_4$, L=$H_2O$, z=4, b=24 and E=$H_2O$.

8. The composition of claim 1 wherein:
Cat is $Li^+$, m=6, M=Cd or Ni, a=3, X=$SO_4$ or $VO_4$, L=$H_2O$, z=4, b=24 and E=$H_2O$.

* * * * *